United States Patent
Deichmann et al.

(10) Patent No.: US 9,619,084 B2
(45) Date of Patent: Apr. 11, 2017

(54) TOUCH SCREEN SYSTEMS AND METHODS FOR SENSING TOUCH SCREEN DISPLACEMENT

(71) Applicant: Corning Incorporated, Corning, NY (US)

(72) Inventors: Oberon Denaci Deichmann, Corning, NY (US); William James Miller, Horseheads, NY (US); Daniel Aloysius Nolan, Corning, NY (US); Lucas Wayne Yeary, Corning, NY (US)

(73) Assignee: Corning Incorporated, Corning, NY (US)

( * ) Notice: Subject to any disclaimer, the term of this patent is extended or adjusted under 35 U.S.C. 154(b) by 176 days.

(21) Appl. No.: 14/041,426

(22) Filed: Sep. 30, 2013

(65) Prior Publication Data
US 2014/0098065 A1  Apr. 10, 2014

Related U.S. Application Data

(60) Provisional application No. 61/744,831, filed on Oct. 4, 2012.

(51) Int. Cl.
G06F 3/042 (2006.01)
G06F 3/041 (2006.01)

(52) U.S. Cl.
CPC .......... *G06F 3/0421* (2013.01); *G06F 3/0414* (2013.01)

(58) Field of Classification Search
CPC .............................. G06F 3/0414; G06F 3/0421
USPC .................................................. 345/173–175
See application file for complete search history.

(56) References Cited

U.S. PATENT DOCUMENTS

| | | | |
|---|---|---|---|
| 4,484,179 A | 11/1984 | Kasday | 340/365 |
| 4,511,760 A | 4/1985 | Garwin et al. | 178/18 |
| 4,542,375 A | 9/1985 | Alles et al. | 340/712 |
| 4,687,885 A | 8/1987 | Talmage, Jr. et al. | 178/18 |
| 4,725,978 A | 2/1988 | Fujioka | 364/900 |
| 4,963,859 A * | 10/1990 | Parks | G06F 3/0421 341/20 |

(Continued)

FOREIGN PATENT DOCUMENTS

| | | |
|---|---|---|
| EP | 0901229 | 6/2007 |
| EP | 2392904 | 12/2011 |

(Continued)

OTHER PUBLICATIONS

Machine translation of JP2011-103094.
Machine translation of FR2963839.

*Primary Examiner* — Tony Davis
(74) *Attorney, Agent, or Firm* — Jason A. Barron; Joseph E. Gortych (57) ABSTRACT

A touch screen system configured to detect a displacement of a cover sheet when pressure or force is applied to the cover sheet upper surface. A light source and photodetector are configured to be in optical communication by reflection of light from the light source from the lower surface of the cover sheet. A displacement of the coversheet changes the amount of reflected light that falls upon the detector. The detector signal can be used to measure the amount of displacement, as well as the time-evolution of the displacement. The touch-screen system can be interfaced with a touch-sensitive display unit to form a display system having both pressure-sensing capability and touch-sensing capability.

10 Claims, 10 Drawing Sheets

(56) References Cited

U.S. PATENT DOCUMENTS

| | | | | |
|---|---|---|---|---|
| 5,222,400 | A | 6/1993 | Hilton | 73/862.043 |
| 5,315,128 | A * | 5/1994 | Hunt | G01J 3/26 |
| | | | | 257/16 |
| 5,446,480 | A | 8/1995 | Yoshida | 345/157 |
| 5,610,629 | A | 3/1997 | Baur | 345/104 |
| 6,031,520 | A | 2/2000 | De Gotari | 345/157 |
| 6,084,571 | A | 7/2000 | De Gotari | 345/157 |
| 6,326,948 | B1 | 12/2001 | Kobachi et al. | 345/157 |
| 6,504,530 | B1 | 1/2003 | Wilson et al. | 345/173 |
| 6,556,149 | B1 | 4/2003 | Reimer et al. | 341/20 |
| 6,788,295 | B1 | 9/2004 | Inkster | 345/175 |
| 6,804,012 | B2 | 10/2004 | Gombert | 356/614 |
| 6,816,537 | B2 | 11/2004 | Liess | 372/109 |
| 6,900,795 | B1 | 5/2005 | Knight, III et al. | 345/173 |
| 7,002,555 | B1 * | 2/2006 | Jacobsen | G06F 3/0421 |
| | | | | 178/18.01 |
| 7,157,649 | B2 | 1/2007 | Hill | 178/18.04 |
| 7,158,054 | B2 | 1/2007 | Pihlaja | 341/22 |
| 7,183,948 | B2 | 2/2007 | Roberts | 341/34 |
| 7,417,627 | B2 | 8/2008 | Cok | 345/173 |
| 7,515,140 | B2 | 4/2009 | Philipp | 345/173 |
| 7,685,538 | B2 | 3/2010 | Fleck et al. | 715/863 |
| 7,786,978 | B2 | 8/2010 | Lapstun et al. | 345/166 |
| 7,903,090 | B2 | 3/2011 | Soss et al. | 345/173 |
| 7,920,124 | B2 | 4/2011 | Tokita et al. | 345/156 |
| 8,049,739 | B2 | 11/2011 | Wu et al. | 345/175 |
| 8,130,210 | B2 | 3/2012 | Saxena et al. | 345/175 |
| 8,179,375 | B2 | 5/2012 | Ciesla et al. | 345/173 |
| 8,253,712 | B2 | 8/2012 | Klinghult | 345/174 |
| 8,325,158 | B2 | 12/2012 | Yatsuda et al. | 345/176 |
| 8,368,677 | B2 | 2/2013 | Yamamoto | 345/207 |
| 8,378,975 | B2 | 2/2013 | Yoon et al. | 345/174 |
| 8,390,481 | B2 | 3/2013 | Pance et al. | 341/33 |
| 8,395,601 | B2 | 3/2013 | Nho et al. | 345/176 |
| 8,411,068 | B2 | 4/2013 | Lu et al. | 345/175 |
| 8,553,014 | B2 | 10/2013 | Holmgren et al. | 345/176 |
| 8,736,581 | B2 * | 5/2014 | Han | G06F 3/0412 |
| | | | | 178/18.09 |
| 9,019,238 | B2 * | 4/2015 | Kim | G06F 3/0412 |
| | | | | 178/18.09 |
| 9,158,416 | B2 * | 10/2015 | Eriksson | G06F 3/0421 |
| 9,170,683 | B2 * | 10/2015 | Drumm | G06F 3/0421 |
| 2001/0007449 | A1 | 7/2001 | Kobachi et al. | 345/156 |
| 2002/0017612 | A1 * | 2/2002 | Yu | B82Y 10/00 |
| | | | | 250/370.11 |
| 2003/0026971 | A1 | 2/2003 | Inkster et al. | 428/345 |
| 2006/0096392 | A1 | 5/2006 | Inkster et al. | 73/862.041 |
| 2008/0007542 | A1 * | 1/2008 | Eliasson | G06F 3/0346 |
| | | | | 345/176 |
| 2008/0068343 | A1 | 3/2008 | Hoshino et al. | 345/173 |
| 2008/0088597 | A1 | 4/2008 | Prest et al. | 345/173 |
| 2008/0088600 | A1 | 4/2008 | Prest et al. | 345/173 |
| 2008/0284742 | A1 | 11/2008 | Prest et al. | 345/173 |
| 2008/0289884 | A1 | 11/2008 | Elwell | 178/18.01 |
| 2008/0303797 | A1 | 12/2008 | Grothe | 345/173 |
| 2009/0015564 | A1 | 1/2009 | Ye et al. | 345/173 |
| 2009/0219253 | A1 | 9/2009 | Izadi et al. | 345/173 |
| 2009/0219261 | A1 | 9/2009 | Jacobson et al. | 345/175 |
| 2010/0001978 | A1 | 1/2010 | Lynch et al. | 345/175 |
| 2010/0060548 | A1 | 3/2010 | Choi et al. | 345/1.3 |
| 2010/0103123 | A1 | 4/2010 | Cohen et al. | 345/173 |
| 2010/0103140 | A1 | 4/2010 | Hansson | 345/175 |
| 2010/0117974 | A1 | 5/2010 | Joguet et al. | 345/173 |
| 2010/0117989 | A1 | 5/2010 | Chang | 345/175 |
| 2010/0156847 | A1 | 6/2010 | No et al. | 345/175 |
| 2010/0207906 | A1 | 8/2010 | Anglin et al. | 345/174 |
| 2010/0238454 | A1 * | 9/2010 | Pruessner | G01G 3/165 |
| | | | | 356/479 |
| 2010/0245288 | A1 | 9/2010 | Harris | 345/175 |
| 2010/0253650 | A1 | 10/2010 | Dietzel et al. | 345/175 |
| 2010/0302185 | A1 * | 12/2010 | Han et al. | 345/173 |
| 2010/0302196 | A1 * | 12/2010 | Han | G06F 3/0425 |
| | | | | 345/173 |
| 2010/0321310 | A1 | 12/2010 | Kim et al. | 345/173 |
| 2011/0050650 | A1 * | 3/2011 | McGibney et al. | 345/175 |
| 2011/0075241 | A1 * | 3/2011 | Mienko | G02B 26/001 |
| | | | | 359/263 |
| 2011/0122091 | A1 | 5/2011 | King et al. | 345/175 |
| 2011/0141053 | A1 | 6/2011 | Bulea et al. | 345/174 |
| 2011/0157092 | A1 | 6/2011 | Yang | 345/175 |
| 2011/0163998 | A1 * | 7/2011 | Goertz | G06F 3/0416 |
| | | | | 345/175 |
| 2011/0227874 | A1 * | 9/2011 | Fahraeus et al. | 345/175 |
| 2011/0248151 | A1 * | 10/2011 | Holcombe | G01S 3/7803 |
| | | | | 250/221 |
| 2011/0298742 | A1 | 12/2011 | Dingnan | 345/173 |
| 2012/0056821 | A1 * | 3/2012 | Goh | G06F 3/04883 |
| | | | | 345/173 |
| 2012/0068939 | A1 | 3/2012 | Pemberton-Pigott | 345/173 |
| 2012/0068970 | A1 | 3/2012 | Pemberton-Pigott | 345/175 |
| 2012/0068971 | A1 | 3/2012 | Pemberton-Pigott | 345/175 |
| 2012/0068973 | A1 * | 3/2012 | Christiansson | G06F 3/0421 |
| | | | | 345/175 |
| 2012/0071206 | A1 | 3/2012 | Pemberton-Pigott | 455/566 |
| 2012/0092250 | A1 | 4/2012 | Hadas et al. | 345/156 |
| 2012/0169672 | A1 * | 7/2012 | Christiansson | G06F 3/0421 |
| | | | | 345/175 |
| 2012/0176345 | A1 | 7/2012 | Ye et al. | 345/175 |
| 2012/0212451 | A1 | 8/2012 | Large et al. | 345/175 |
| 2012/0242607 | A1 | 9/2012 | Ciesla et al. | 345/173 |
| 2012/0326981 | A1 | 12/2012 | Kurose | 345/160 |
| 2013/0107306 | A1 | 5/2013 | Yoon et al. | 358/1.13 |
| 2013/0135254 | A1 | 5/2013 | Lee et al. | 345/175 |
| 2013/0187891 | A1 * | 7/2013 | Eriksson et al. | 345/175 |
| 2014/0168153 | A1 * | 6/2014 | Deichmann | G06F 3/044 |
| | | | | 345/174 |

FOREIGN PATENT DOCUMENTS

| | | |
|---|---|---|
| EP | 2437144 | 4/2012 |
| EP | 2437145 | 4/2012 |
| EP | 2439620 | 4/2012 |
| EP | 2439619 | 5/2012 |
| FR | 2963839 | 8/2010 |
| GB | 2313195 | 11/1997 |
| JP | 2011103094 | 5/2011 |
| WO | 02/35460 | 5/2002 |
| WO | 2010/063320 | 6/2010 |
| WO | 2012/027599 | 3/2012 |
| WO | 2012/034221 | 3/2012 |
| WO | 2012/087286 | 6/2012 |
| WO | 2013/029641 | 3/2013 |
| WO | 2013/037385 | 3/2013 |
| WO | 2013/068651 | 5/2013 |

* cited by examiner

TOUCH SCREEN SYSTEMS AND METHODS FOR SENSING TOUCH SCREEN DISPLACEMENT

CROSS-REFERENCE TO RELATED APPLICATIONS

This application claims the benefit of priority under 35 U.S.C. §119 of U.S. Provisional Application Ser. No. 61/744,831, filed on Oct. 4, 2012, the content of which is relied upon and incorporated herein by reference in its entirety.

FIELD

The present disclosure relates to touch-sensitive devices, and in particular to touch screen systems and methods for sensing touch-screen displacement.

BACKGROUND ART

The market for displays and other devices (e.g., keyboards) having non-mechanical touch functionality is rapidly growing. As a result, touch-sensing techniques have been developed to enable displays and other devices to have touch functionality. Touch-sensing functionality is gaining wider use in mobile device applications, such as smart phones, e-book readers, laptop computers and tablet computers.

Touch systems in the form of touch screens have been developed that respond to a variety of types of touches, such as single touches, multiple touches, and swiping. Some of these systems rely on light-scattering and/or light-attenuation based on making optical contact with the touch-screen surface, which remains fixed relative to its support frame. An example of such a touch-screen system is described in U.S. Patent Application Publication No. 2011/0122091.

While effective, there remains a need for alternative optics-based approaches to touch-sensing that can provide the required sensitivity to sense a touch event that applies sufficient force to displace the touchscreen. Such touch events can be used to add another aspect to the touch screen functionality.

SUMMARY

An aspect of the disclosure is a touch screen system configured to detect a displacement of a cover sheet when pressure or force is applied to the cover sheet upper surface. A light source and photodetector are configured to be in optical communication by reflection of light from the light source from the lower surface of the cover sheet. A displacement of the coversheet changes the amount of reflected light that falls upon the detector. The detector signal can be used to measure the amount of displacement, as well as the time-evolution of the displacement. The touch-screen system can be interfaced with a touch-sensitive display unit to form a display system having both applied pressure-sensing capability and touch-sensing capability.

Additional features and advantages of the disclosure are set forth in the detailed description that follows, and in part will be readily apparent to those skilled in the art from that description or recognized by practicing the disclosure as described herein, including the detailed description that follows, the claims, and the appended drawings.

The claims as well as the Abstract are incorporated into and constitute part of the Detailed Description set forth below.

All publications, articles, patents, published patent applications and the like cited herein are incorporated by reference herein in their entirety.

BRIEF DESCRIPTION OF THE DRAWINGS

Cartesian coordinates are shown in certain of the Figures for the sake of reference and are not intended as limiting with respect to direction or orientation.

DETAILED DESCRIPTION

The present disclosure can be understood more readily by reference to the following detailed description, drawings, examples, and claims, and their previous and following description. However, before the present compositions, articles, devices, and methods are disclosed and described, it is to be understood that this disclosure is not limited to the specific compositions, articles, devices, and methods disclosed unless otherwise specified, as such can, of course, vary. It is also to be understood that the terminology used herein is for the purpose of describing particular aspects only and is not intended to be limiting.

The following description of the disclosure is provided as an enabling teaching of the disclosure in its currently known embodiments. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein.

Thus, if a class of substituents A, B, and C are disclosed as well as a class of substituents D, E, and F, and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and/or C; D, E, and/or F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and/or C; D, E, and/or F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

Figure 1A:
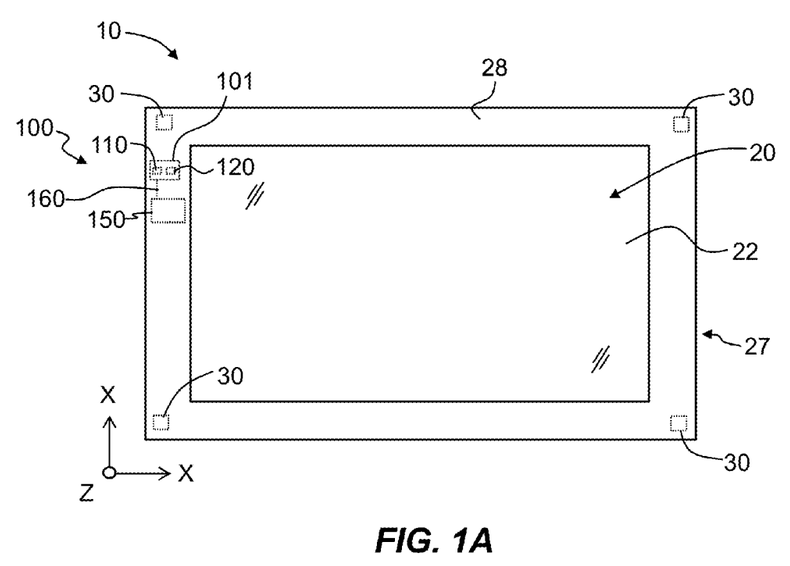
FIGS. 1A and 1B are top-down views of example touch-screen systems according to the disclosure.
Figure 1B:
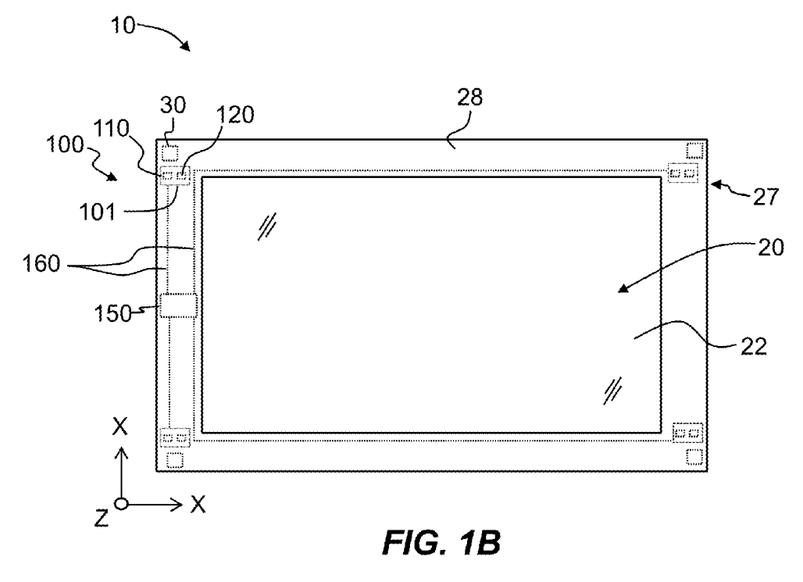
Figure 2A:
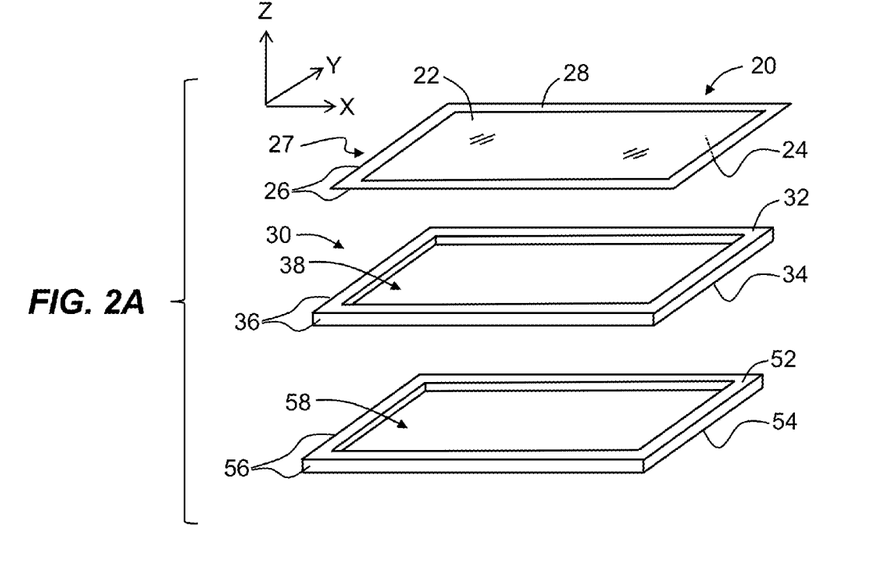
FIG. 2A is an elevated exploded view and FIG. 2B is an assembled view of the cover sheet, stand-off member and frame of an example touch-screen system.
Figure 2B:
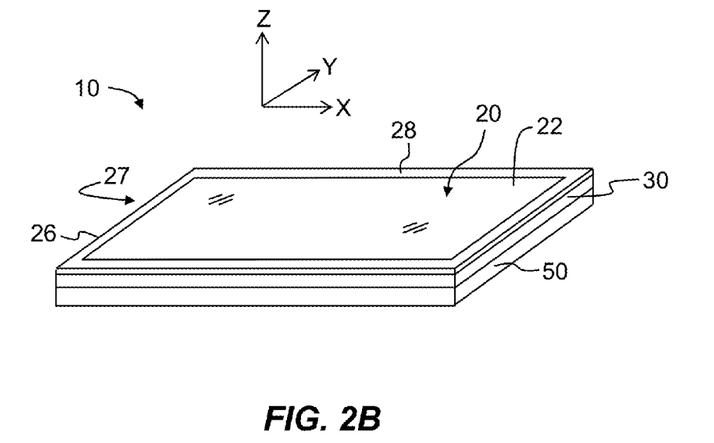
Figure 2C:
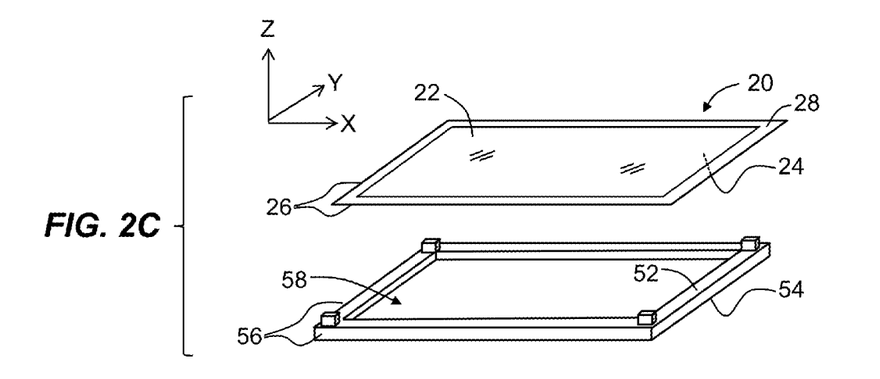
FIG. 2C is an elevated exploded view and FIG. 2D is an assembled view of the cover sheet, stand-off member and frame of another example touch-screen system.
Figure 2D:
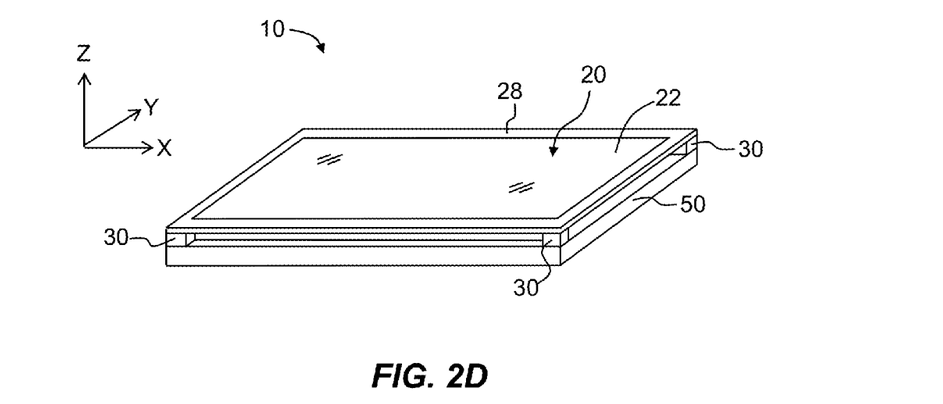
Figure 3A:
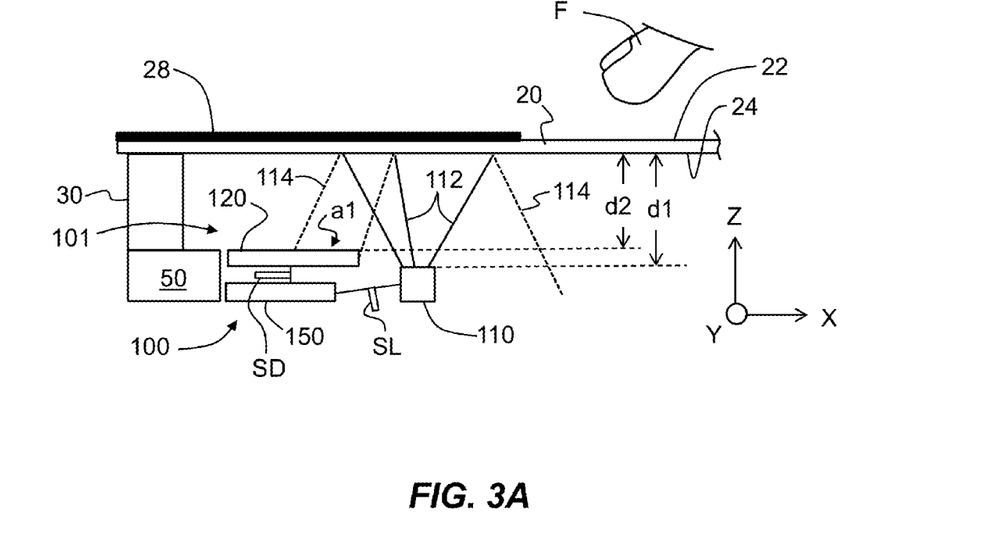
FIG. 3A is a close-up, cross-sectional view of an edge portion of the touch-screen system illustrating how the light source and photodetector are optically coupled by reflection from the lower surface of the cover sheet.

FIGS. 1A and 1B are top-down views of example embodiments of a touch-screen system ("system") 10 according to the disclosure. FIGS. 2A and 2C are exploded elevated views of a portion of system 10, while FIGS. 2B and 2D are the corresponding assembled views. FIG. 3A is a close-up cross-sectional schematic diagram of an end portion of an example of system 10. System 10 may be used in a variety of consumer electronic articles, for example, in conjunction with displays for cell-phones, keyboards, touch screens and other electronic devices such as those capable of wireless communication, music players, notebook computers, mobile devices, game controllers, computer "mice," electronic book readers and the like.

With reference to the above-identified Figures, system 10 includes a cover sheet 20 (also called a "cover screen"), a support frame 50, and at least one stand-off member 30 that separates the cover sheet from the support frame. In an example, stand-off member 30 is resilient so that the distance between the cover sheet and the support frame can be changed by compression of the stand-off member. In another example, stand-off member 30 allows cover sheet 20 to bend so that the cover sheet locally moves closer to the plane of the support frame where pressure or force is applied to the cover sheet. In an example embodiment, stand-off member 30 is resilient but also allows for the cover sheet to bend when pressure is locally applied at a touch location. Also in an example embodiment, frame 50 is configured to interface with a touch-sensitive display, as discussed below in connection with FIG. 8.

Cover sheet 20 can be made of glass, ceramic or glass-ceramic, and can be transparent, semi-transparent or opaque to an operating wavelength $\lambda$. Cover sheet 20 has an upper surface 22, a lower surface 24, and edges 26. Edges 26 define a perimeter 27. An example glass for cover sheet 20 is Gorilla® Glass from Corning, Inc., of Corning, N.Y.

In an example embodiment, cover sheet 20 includes a cover 28 that resides adjacent edge 26 and either on upper surface 22, lower surface 24 or both surfaces. Cover 28 is opaque to at least visible light. Cover 28 can be partially or nearly totally reflective when disposed on lower surface 24 and can be light-absorbing when disposed on upper surface 22.

In an example, cover 28 can be any type of light-blocking member, bezel, film, paint, glass, component, material, texture, structure, etc. that serves to block at least visible light and that is configured to keep some portion of touch system 10 from being viewed by a user, or that in an example blocks one wavelength of light while transmitting another.

The at least one stand-off member 30 resides immediately adjacent lower surface 24 of cover sheet 20 or near one or more of edges 26 so that it is covered by cover 28. With reference to FIGS. 2A and 2B, an example stand-off member 30 is in the form of a gasket having upper surface 32, a lower surface 34, and edges 36, and defines a central opening 38. In another example illustrated in FIGS. 2C and 2D, four small square stand-off members 30 reside at the corners of cover sheet 20 at lower surface 24. Example materials for a resilient stand-off member 30 include elastomer, foam, springs, rubber, bellows, sponge or like deformable material that returns to its original shape when the deforming force is removed.

Frame 50 has upper and lower surfaces 52 and 53 respectively, edges 56, and defines a central aperture 58. Example materials for frame 50 include metal or plastic.

System 10 also includes at least one optical displacement-sensing device 100 that in an example includes a sensor head 101 and a microcontroller 150. Sensor head 101 comprises a light source 110 operably arranged relative to a photodetector 120, as illustrated best in FIG. 3A. Sensor head 101 is connected to microcontroller 150 via an electrical line 160. Example light sources 110 include LEDs, laser diodes, optical-fiber-based lasers, extended light sources, point light sources, and the like. Photodetector 120 can be an array of photodiodes, a large-area photosensor, a linear photosensor, a collection or array of photodiodes, a CMOS detector, a CCD camera, or the like. Example sensor heads 101 are the OSRAM proximity sensor, type SFH 7773, which uses an 850 nm light source 110 and a highly linear light sensor as detector 120, or Vishay proximity sensor VCNL 3020.

Controller 150 is configured to control the operation of system 10. In some embodiments, the controller 300 includes a processor 302, a device driver 304 and interface circuit 306, all operably arranged, e.g., on a motherboard or integrated into a single integrated-circuit chip or structure. Controller 150 executes instructions stored in firmware and/or software (not shown). In an example, controller 150 is programmable to perform the functions described herein, including the operation of the touch system and any signal processing that is required to measure, for example, relative amounts of pressure or force, and/or the displacement of the cover sheet. As used herein, the term computer is not limited to just those integrated circuits referred to in the art as computers, but broadly refers to computers, processors, microcontrollers, microcomputers, programmable logic controllers, application-specific integrated circuits, and other programmable circuits, and these terms are used interchangeably herein.

Software may implement or aid in performing the pressure-sensing functions and operations disclosed herein. The software may be operably installed in controller 300 or processor 302. Software functionalities may involve programming, including executable code, and such functionalities may be used to implement the methods disclosed herein. Such software code is executable by the general-purpose computer or by the processor unit described below.

In operation, the code and possibly the associated data records are stored within a general-purpose computer platform, within the processor unit, or in local memory. At other times, however, the software may be stored at other locations and/or transported for loading into the appropriate general-purpose computer systems. Hence, the embodiments discussed herein involve one or more software products in the form of one or more modules of code carried by at least one machine-readable medium. Execution of such code by a processor of the computer system or by the processor unit enables the platform to implement the catalog and/or software downloading functions, in essentially the manner performed in the embodiments discussed and illustrated herein.

With reference to FIG. 3A, controller 150 controls light source 110 via a light-source signal SL and also receives and processes a detector signal SD from photodetector 120.

In the case where there are multiple sensor heads 101, then a single microcontroller can be used to control the operation of all of the optical sensor heads. Further, the multiple sensor heads 101 and the single microcontroller can be connected by multiple electrical connection lines 160 considered a single optical displacement-sensing device. In an example, multiple electrical lines 160 are in the form of a bus.

In example embodiments of the disclosure, an amount of pressure (e.g., a relative amount of pressure or force) is applied at a touch location TL associated with a touch event TE. Aspects of the disclosure are directed to sensing the occurrence of a touch event TE, including relative amounts of applied force as a function of the displacement of cover sheet 20, as explained below. The time-evolution of the displacement (or multiple displacements over the course of time) can also be determined.

With reference in particular to FIG. 3A, in an example, optical displacement-sensing device 100 is arranged adjacent lower surface 24 of cover sheet 20 and beneath cover 28. Sensor head 101 is arranged with light source 110 and photodetector 120 in a side-by-side arrangement. Light source 110 is shown arranged at a distance d1 from lower surface 24 of cover sheet 20, while photodetector is shown arranged at a distance d2. In an example, d1=d2. Light source 110 emits light 112 that reflects from lower surface 24 to form reflected light 114. Some of light 112 travels at an angle relative to the vertical (Z-direction), either because light 112 diverges or because light source 1120 is tilted, or both. Some of reflected light 114 is received by photodetector 120. The area on which reflected light 114 is detected on photodetector 120 is denoted a1, and may be all of the photodetector active area, but generally is only a portion of the total active area.

Figure 3B:
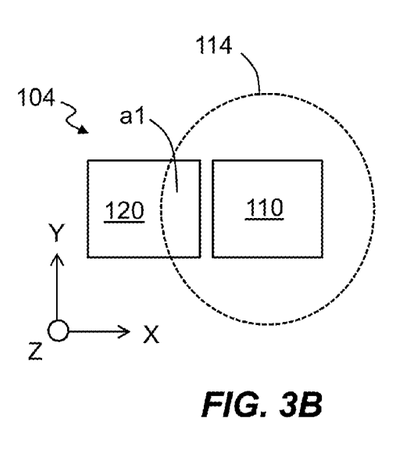
FIGS. 3B and 3C are top-down views of the light source and photodetector, along with the perimeter of the reflected light at the photodetector plane, illustrating a first area of reflected light on the photodetector when in the absence of a touch event.
Figure 3C:
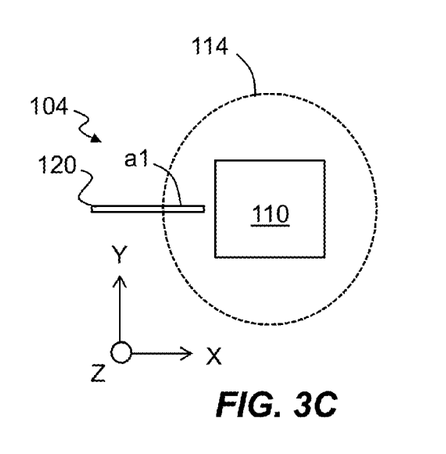

FIG. 3B is a top-down view of sensor head 101 and showing the outer perimeter of reflected light 114 in the plane of photodetector 20, with the area a1 of the photodetector being illuminated. FIG. 3C is similar to FIG. 3B and shows a linear photodetector 120 rather than an area photodetector. In the case of a linear detector, area a1 is a linear measure of the outward (radial) extent of the perimeter of reflected light 114. In response to the reflected light 114 covering area a1 of photodetector 120, the photodetector generates a detector signal SD representative of the amount of power P1 detected.

Figure 4A:
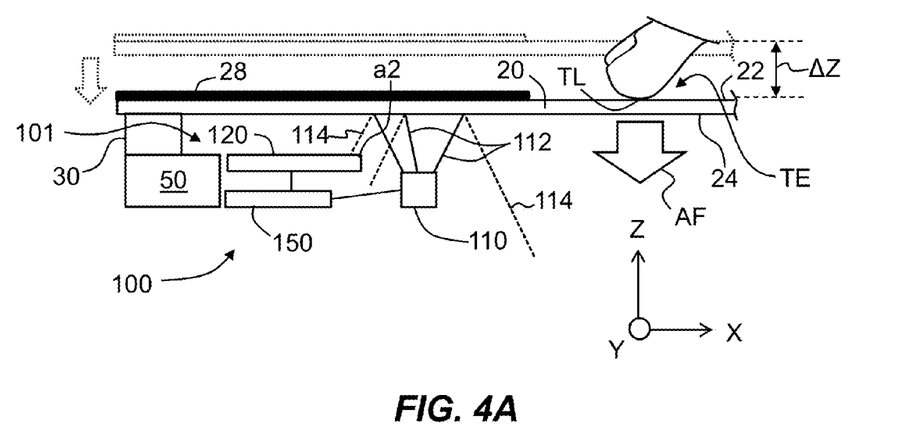
FIG. 4A is similar to FIG. 3A and shows a finger exerting pressure (force) at a touch location, with the force causing the cover sheet to be displaced toward the support frame, and causing the amount of light reflected onto the photodetector to be reduced.

FIG. 4A is essentially the same as FIG. 3A, except that now finger F that was poised above cover sheet 20 now presses down on cover sheet upper surface 22 to cause a touch event TE at a touch event location TL. Touch event TE has an associated force AF. In the case where stand-off member 30 is resilient, force AF causes the one or more stand-off members to compress, which allows cover sheet 20 to move (i.e., be displaced) in the −Z direction. The original location of cover sheet 20 is shown in phantom. The maximum displacement D=ΔZ can be relatively small, e.g., from 0.5 mm to a few millimeters. This causes lower surface 24 of cover sheet 20 to be closer to light source 110, which in turn causes a smaller amount of reflected light 114 to be incident upon photodetector 120. The smaller amount of reflected light 114 represents a smaller area a2 of the reflected light covering photodetector 120. The smaller amount of reflected light results in detector signal SD representing a smaller amount P2 of detected power.

Figure 4B:
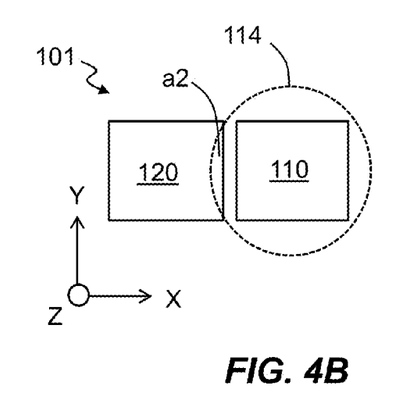
FIGS. 4B and 4C are similar to FIGS. 3B and 3C and show the reduced area of the reflected light on the photodetector.
Figure 4C:
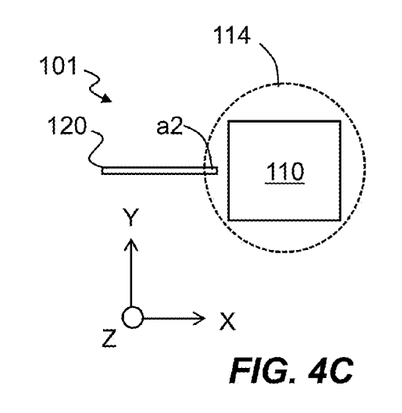

FIGS. 4B and 4C are similar to FIGS. 3A and 3B and shown the reduced size of the outer perimeter of reflected light 114 and the smaller area a2 of the reflected light on photodetector 120.

Figure 5A:
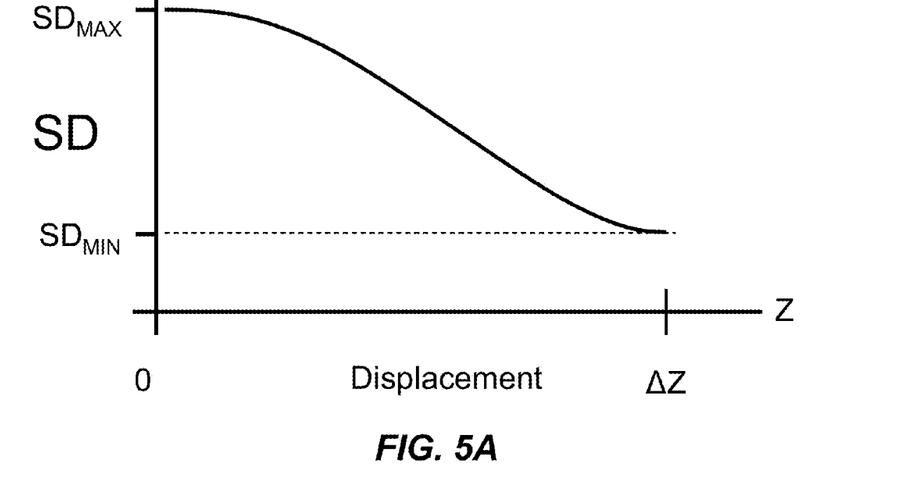
FIG. 5A is a plot of detector signal SD versus the displacement in Z of the cover sheet, illustrating how the change in the amount of light reflected to the photodetector results in a change in the detector signal.

FIG. 5A is a schematic plot of the detector signal SD vs. cover sheet displacement in the Z-direction for an example touch event TE. The plot of FIG. 5A shows how the detector signal varies between a maximum value $SD_{MAX}$ and a minimum value $SD_{MIN}$ when the displacement goes from 0 to ΔZ. It is useful to ensure that that least some reflected light 114 is incident upon photodetector 120 at the maximum displacement ΔZ so that displacement can be tracked over its entire course from Z=0 to Z=ΔZ.

Figure 5B:
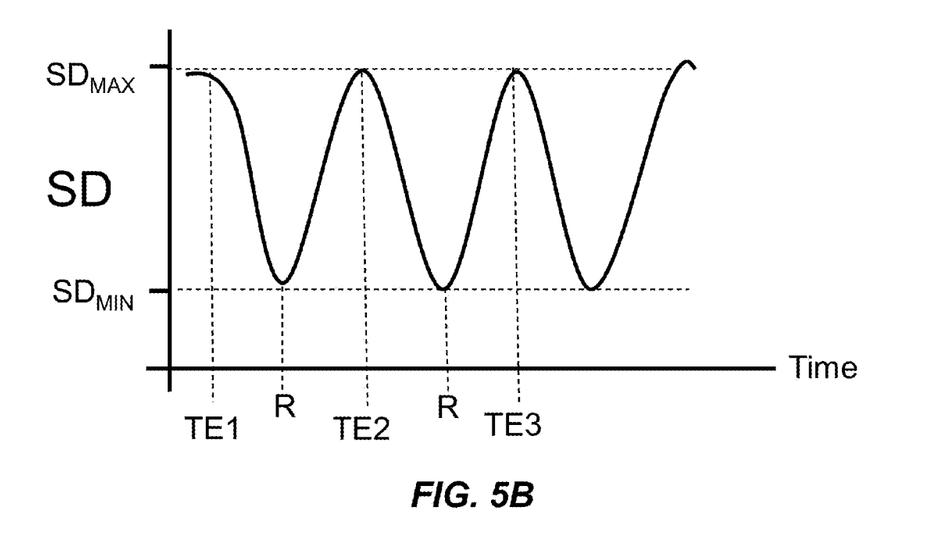
FIG. 5B is a plot of detector signal SD versus time for a number of touch events TE1, TE2 and TE3, between which the pressure of the touch event was released (R) so that the cover sheet returned to its original position.

FIG. 5B is a schematic plot of the detector SD vs. time for a series of touch events TE1, TE2, TE3 separate by a "release" R of force AF. The plot of FIG. 5 shows how the detector signal SD varies as the touch screen is initially displaced and then returns to its original position when the force AF from the touch event TE is released. This type of successive touch event can be used to perform a particular action that is different from say a single touch event that only creates a single dip in the SD vs. time plot.

Figure 6A:
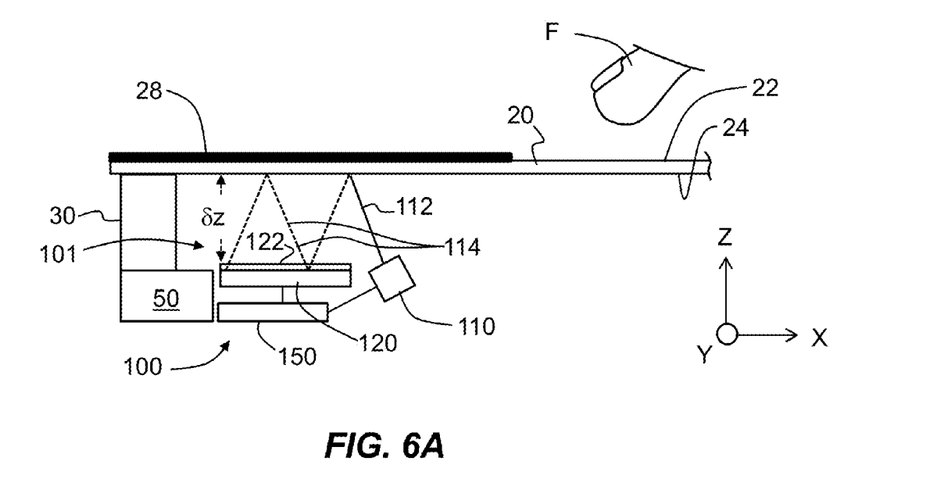
FIG. 6A is similar to FIG. 3A and illustrates an example embodiment wherein the photodetector and lower surface of the cover sheet defines a Fabry-Perot cavity.
Figure 6B:
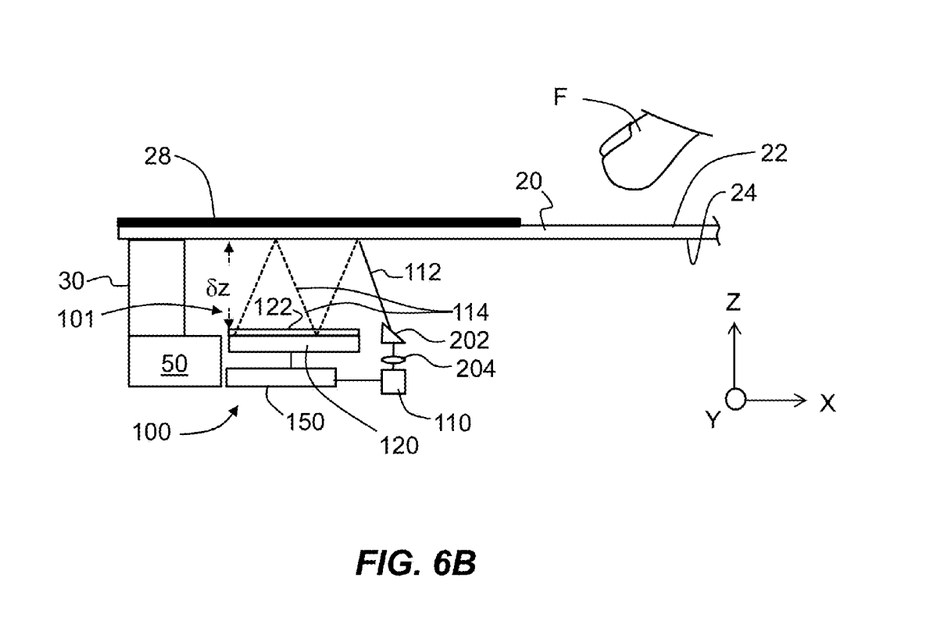
FIG. 6B is similar to FIG. 6A, but rather than having the light source tilted, optical components are used to direct the light beam at an angle relative to the lower surface of the cover sheet.

FIG. 6A is similar to FIG. 3A, and illustrates an example embodiment where light source 110 is tilted relative to the Z-axis so that light 112 is incident upon lower surface 24 at an angle relative to the surface normal. This allows for light 112 to be a collimated beam rather than a divergent beam. FIG. 6B is similar to FIG. 6A and shows an example where a beam-steering elements 202 is used to steer the light beam 112 to form an angle with lower surface 24. In an example, one or more optical elements 204 can be used to assist in processing light 112, e.g., by collimating the light beam or otherwise shaping or conditioning the light beam.

Tilt sensing can be done using the reflective/proximity detection approach (FIG. 4A) or with the Fabry-Perot detection approach (FIG. 6A). This can be done by tilting sensor head 100. In an example, tilt-sensing can be accomplished by tilting light source 100. Tilting light source 100 enhances the walking of the beam as cover sheet 20 is displaced. This allows detector 120 to be closer to lower surface 24 of cover sheet 20 and still function correctly.

FIG. 6A also shows an example where a partially reflecting member 122 is operably arranged adjacent photodetector 120. This defines a Fabry-Perot cavity between lower surface 24 and partially reflecting member 122. In an example embodiment, lower surface 24 includes a reflective coating selected so that the Fabry-Perot has a suitable finesse. In this configuration, a change in the displacement $\delta z$ between the lower surface 24 of cover sheet 20 and partially reflecting member 122 causes a dramatic change in the amount of light transmitted by the Fabry-Perot cavity and thus detected by photodetector 120. This is because the transmission of the Fabry-Perot cavity changes strongly with a change in distance $\delta z$.

Figure 6C:
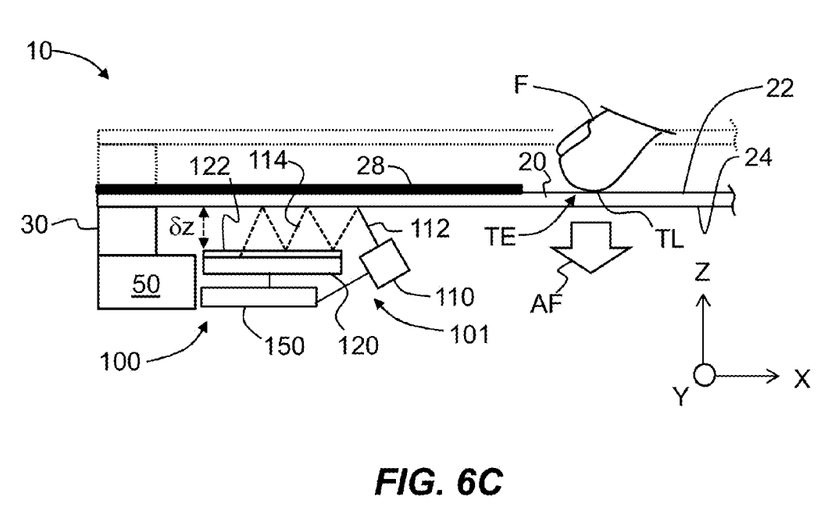
FIG. 6C is similar to FIG. 6A, except that a force is applied at the touch location that displaces the cover sheet toward the support frame, which changes the distance δz of the Fabry-Perot cavity and hence the cavity transmission.

FIG. 6C is similar to FIG. 6A, except that finger F has been applied to cover sheet 20 at upper surface 22 to cause a touch event at touch location TL. Finger F applied the aforementioned force AF that displaces cover sheet 20 by $\Delta Z$ so that the Fabry-Perot spacing $\delta z$ changes, thereby causing a change in detector signal SD.

In the above examples, stand-off member 30 can be substantially non-compressible so that bending of cover sheet 20 causes the change in detector signal SD. Also, the change in detector signal SD may be from a combination of bending of cover sheet 20 as well as from compression of the at least one stand-off member 30.

Figure 7A:
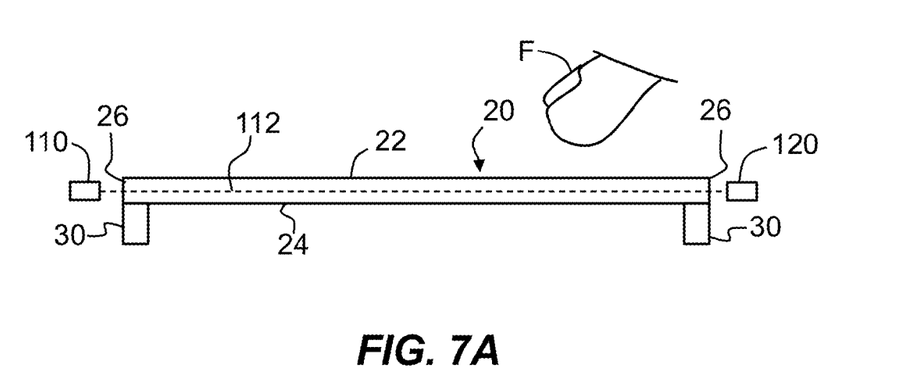
FIGS. 7A through 7C are cross-sectional views of example embodiments where the displacement of the cover sheet changes the transmission of light between the light source and the photodetector.

FIG. 7A is a cross-sectional view of cover sheet 20 supported by stand-off members 30 at edges 26 and at lower surface 24. Light source 110 is disposed adjacent one edge 26 while photodetector 120 is disposed at the opposite edge. Light 112 travels from light source 110 to photodetector 120 through cover sheet 20. Microcontroller 150, which is not shown, is operably connected to light source 110 and photodetector 120.

Figure 7B:
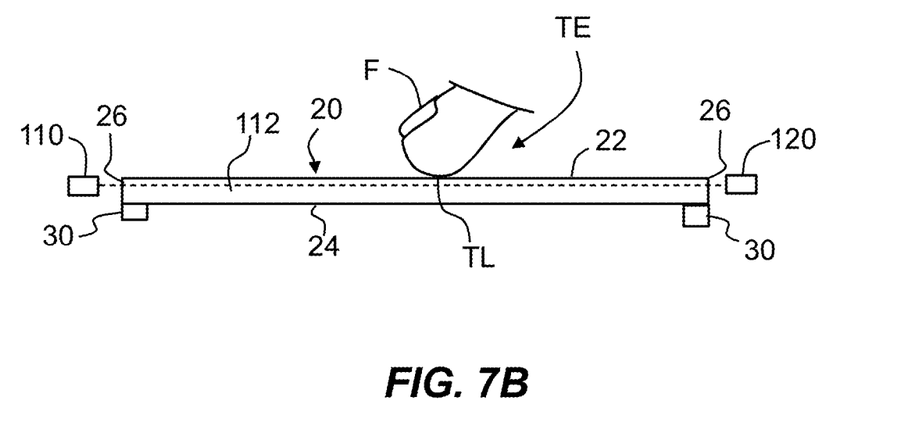

In FIG. 7A, finger F resides above cover sheet 20 adjacent upper surface 22. In FIG. 7B, finger F creates a touch event TE at touch location TL by pushing down on the cover sheet. The force AF serves to compress stand-off members 30. This causes the light beam 112 to "walk" relative to photodetector 120, thereby changing the amount of light detected by the photodetector.

Figure 7C:
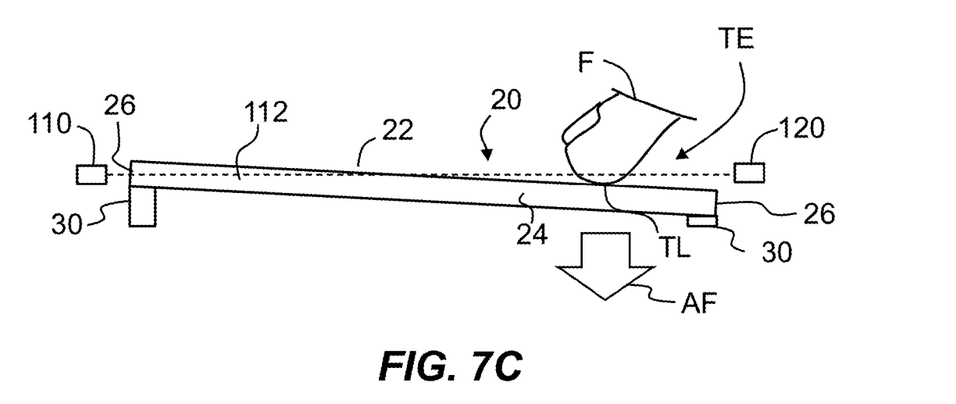

FIG. 7C is similar to FIG. 7B, except that finger F causes only one of the stand-off members 30 to be compressed, so that cover sheet 20 is tilted. This causes light beam to travel a different optical path from light source 110 to photodetector 120 because the light beam only passes through a portion of cover sheet 20. The different optical path as compared to the configuration of FIG. 7A results in a different detector signal SD. The difference can be used to detect whether a touch event occurred.

Display System

Figure 8:
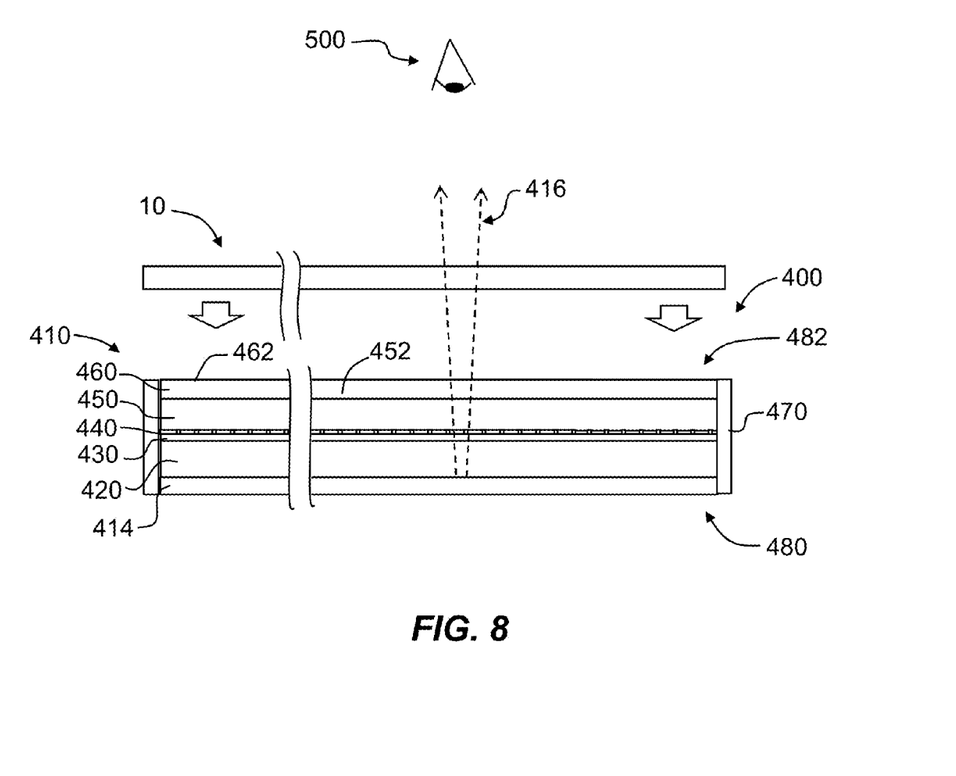
FIG. 8 is a schematic diagram of an example display system that includes a touch-sensitive display unit interfaced with the touch-screen system disclosed herein.

Touch system 10 can be used in combination with conventional position-sensing display systems, such as those that are capacitive-based and resistive-based. FIG. 8 is a schematic elevated view of an example pressure-sensing display 400 formed by operably arranging touch system 10 adjacent and above (e.g., atop) a conventional display unit 410, such as a liquid crystal display, which display may have conventional position-based sensing capability. The conventional display unit 410 is shown in the form of a liquid crystal display that includes a backlighting unit 414 that emits light 416, a thin-film transistor (TFT) glass layer 420, a liquid crystal layer 430, a color filter glass layer 450 with a upper surface 452, and a top polarizer layer 460 with a upper surface 462, all arranged as shown. A frame 470 is disposed around the edge of color filter glass layer 450. Light source 100 is shown by way of example as being operably supported within frame 470. This forms an integrated display system 480 having a top side 482.

To form the final touch-sensitive display 400, system 10 is added to integrated display system 480 of conventional display unit 410 by operably disposing the system on top side 482.

In an example, various indicia or indicium (not shown) such as keyboard may be presented to user 500 on or through system 10 to guide the user to interact with touch system 10. By way of example, the indicium may include areas on upper surface 22 of transparent sheet 20 that are set aside for indicating user choices, software execution, etc., or to indicate a region where the user should create touch event TE. Such region, for example, might be required where light 112 does not reach certain portions of upper surface 26A.

Although the embodiments herein have been described with reference to particular aspects and features, it is to be understood that these embodiments are merely illustrative of desired principles and applications. It is therefore to be understood that numerous modifications may be made to the illustrative embodiments and that other arrangements may be devised without departing from the spirit and scope of the appended claims.

What is claimed is:

1. A touch screen system for sensing a touch event, comprising:

a cover screen having an upper surface, a lower surface and a perimeter;

a support frame having a central aperture and stood off from the cover screen by at least one resilient stand-off member;

a photodetector disposed adjacent the lower surface of and external to the cover screen, wherein the photodetector and the lower surface of the cover screen are separated by a distance $\delta z$ and define a Fabry-Perot cavity that resides outside of the cover screen and that has a transmission defined by the distance $\delta z$;

a light source that emits light and that is in optical communication with the photodetector via reflection off of a portion of the cover screen lower surface adjacent the perimeter and without the light or the reflected light traveling through or above the cover screen, such that when the cover screen a is displaced toward the support frame by compressing the at least one stand-off member, the amount of reflected light detected by the photodetector changes; and wherein the transmission of the Fabry-Perot cavity changes by changing the distance $\delta z$ when the cover screen is displaced towards or away from the photodetector, thereby causing the change in the amount of light detected by the photodetector, wherein each light source and photodetector defines a sensor head, wherein the system includes multiple sensor heads operably arranged adjacent the cover sheet screen perimeter and adjacent the lower surface, with the multiple sensor heads operably connected to a microcontroller, wherein the signal output from the multiple sensor heads is exported to a computer and used to determine the position and associated force of the touch event, further comprising a capacitive or resistive based system to determine the position of two or more simultaneous touch events, wherein the signal output from the multiple sensor heads is exported to a computer and used to determine the associated force of the two or more simultaneous touch events.

2. The touch screen system of claim 1, further comprising a microcontroller operably connected to the light source and the photodetector and configured to receive a detector signal from the photodetector and determine from tile detector signal an amount of displacement of the cover screen.

3. The touch screen system of claim 1, further comprising a partially reflecting member disposed immediately adjacent the photodetector surface to further define the Fabry-Perot cavity.

4. The touch screen system of claim 1, further including a cover adjacent the perimeter and on at least one of the upper and lower surfaces, the cover being configured to block at least a visible wavelength of light.

5. The touch screen system of claim 1, wherein the portion of the cover screen lower surface adjacent the perimeter from which light from the laser reflects includes a reflection coating.

6. The touch screen system of claim 1, wherein the light from the light source has an infrared wavelength.

7. The touch screen system of claim 1, wherein the cover screen is transparent to a visible wavelength of light.

8. The touch screen system of claim 1, wherein the frame is configured to interface with a touch-sensitive display.

9. A display system, comprising:

the touch-screen system according to claim 1; and a display unit having a display, with the touch-screen operably interfaced therewith.

10. The display system of claim 9, wherein the display unit includes one of capacitive and resistive touch-sensing capability.

* * * * *